H. HUBBELL.
COMBINATION MIRROR AND LIGHT SHIELD.
APPLICATION FILED JUNE 7, 1921.
1,430,379. Patented Sept. 26, 1922.
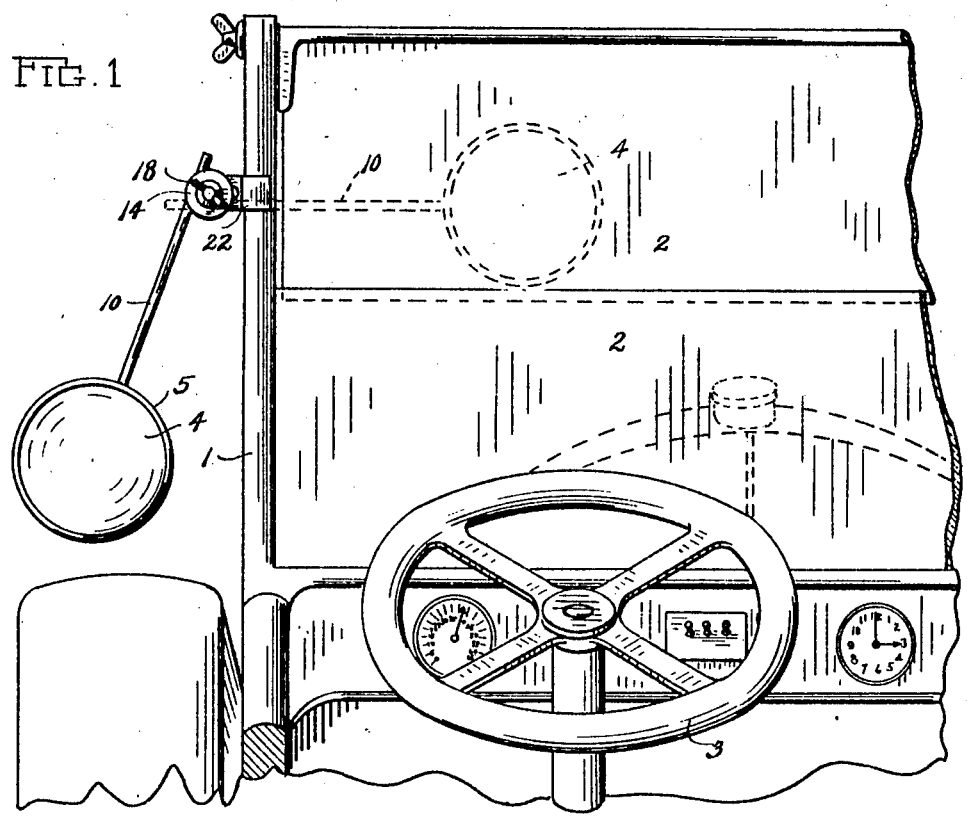
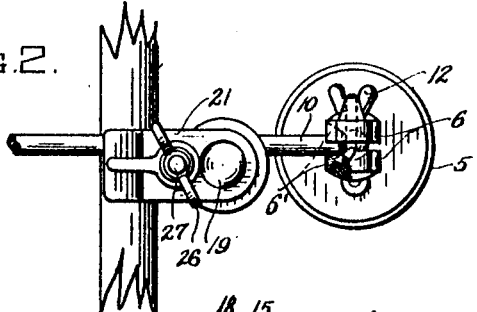
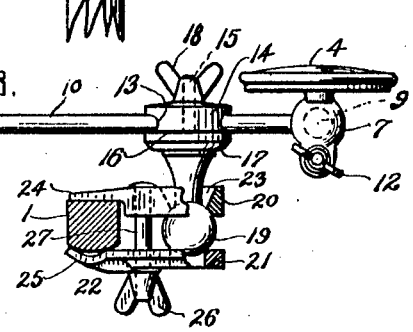
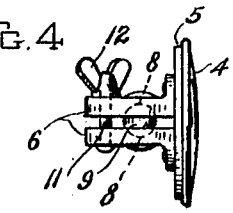
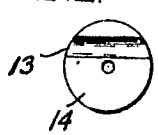
INVENTOR
Harvey Hubbell
BY
A. V. Wooster
ATTORNEY Patented Sept. 26, 1922.

1,430,379

UNITED STATES PATENT OFFICE.

HARVEY HUBBELL, OF BRIDGEPORT, CONNECTICUT.

COMBINATION MIRROR AND LIGHT SHIELD.

Application filed June 7, 1921. Serial No. 475,667.

*To all whom it may concern:*

Be it known that I, HARVEY HUBBELL, a citizen of the United States, residing at Bridgeport, county of Fairfield, State of Connecticut, have invented an Improvement in Combination Mirrors and Light Shields, of which the following is a specification.

This invention relates to a combination mirror and light shield for use on automobiles.

An object of the invention is to provide a simple but reliable mounting for a mirror whereby it may be easily and securely attached to one side of an automobile wind shield frame, and in such a manner that it may be easily swung in front of the driver to act as a light shield and prevent blinding from the glare of the lights on an approaching machine.

Referring to the accompanying drawings, Fig. 1 is a view of a portion of the wind shield and dash of an automobile showing my device in position. Fig. 2 is a rear elevation of the device. Fig. 3 is a plan view thereof. Fig. 4 is an end elevation looking from the right of Fig. 2 and Figs. 5 and 6 are a front and side elevation respectively of the clamping disc for the mirror supporting rod.

Reference numeral 1 indicates a vertical side of the usual wind shield frame or support for an automobile, 2 the glass panels and 3 the steering wheel.

The mirror 4, which may be of any suitable shape, but is preferably convex as shown, is mounted in a frame 5 to the back of which is secured two spaced L-shaped ears 6 having substantially circular body portions 7 provided with opposed recesses 8. These recesses are adapted to receive the ball end 9 of a rod 10, and the ears 6 may be drawn together to clamp them upon the ball 9 by means of a bolt 11 extending through the ears adjacent their free ends and having a wing nut 12. On the sides of the ears 6 on which the rod 10 is located, these ears are provided with flaring recesses or notches 6' which allow adjustment of the mirror at various angles to the axis of the rod as well as around the axis of the rod when nut 12 is loosened. It will thus be seen that there is provided a universal mounting for the mirror on the rod 10 and by tightening the nut 12 the mirror may be secured in any adjusted position. The rod 10 sets within a groove 13 in a clamping disc 14 rotatably mounted on a threaded stud 15 extending outwardly from the flat face 16 of a supporting member 17. A wing-nut 18 is threaded on the stud 15 and as the groove 13 is of less depth than the diameter of the rod 10, by tightening this nut against the disc 14 this disc and with it the rod 10 may be clamped in any desired position on the face 16, the disc turning about the stud 15 as a pivot.

The support 17 is also provided with a ball 19 which is adapted to be clamped between the two sections 20 and 21 of a supporting clamp 22. These sections are provided with recesses in their opposed faces in which the ball 19 fits and one section 20 is provided with a flaring opening 23 in alignment with the recesses to allow adjustment of support 17 in a plurality of directions, thus providing a universal mounting for this support. The sections 20 and 21 are each also formed at one end with a member 24 and 25, respectively, adapted to grip the wind shield frame 1 when the wing-nut 26 on the bolt 27 is tightened. The tightening of the nut 26 also clamps the support 17 in any desired position.

After the nut 26 has been loosened the support with the mirror may be moved to any desired location on the frame 1 and the mirror may also be swung either to a position at the side of the wind shield or in front of the driver as shown in dotted lines in Fig. 1 and then clamped in position by tightening the nut. In operation, however, the supporting clamp 22 is ordinarily moved to its desired position on the frame 1 and the nut 26 tightened clamping it and support 17 in position. Then if it is desired to swing the mirror to the side of or in front of the driver the nut 18 is loosened and the mirror swung about the stud 15 as a pivot. Further, as indicated above, the mirror may be adjusted to various angular relations to the rod 10 by loosening the nut 12.

It will thus be apparent that I have devised a simple mounting for the combination mirror and light shield and one which will allow movement of the mirror or light shield to practically any position desired. After it has been moved to the position desired it may be easily and quickly clamped therein.

Having thus set forth the nature of my invention, what I claim is—

1. A device of the class described including a supporting clamp comprising sections provided with means for gripping the frame of an automobile wind shield, a supporting element having a ball end extending between said sections, means for drawing the sections toward each other to clamp them to the frame and also to said ball, a mirror, a rod having a ball end, means on the mirror for gripping said ball, means for securing the rod to the supporting element comprising a clamping disc adapted to turn on said support, and means for clamping the rod and disc to the supporting element to secure same in adjusted position.

2. A device of the class described including a supporting clamp comprising spaced sections provided with means for clamping the frame of an automobile wind shield, having aligned recesses in their opposed surfaces and one of said members having a transverse opening from its recess, a support extending through said opening and provided with a ball adapted to be clamped in said recesses, a mirror, a rod for supporting said mirror, and means for securing the rod to said support constructed to support the mirror at will either at one side of the wind shield or in front thereof to provide a light shield.

In testimony whereof I affix my signature.

HARVEY HUBBELL.